(12) United States Patent
Younke

(10) Patent No.: US 7,789,444 B1
(45) Date of Patent: Sep. 7, 2010

(54) TURKEY TAIL TRANSPORTER FOR HUNTING

(76) Inventor: Charles D. Younke, 18598 280th, Mason City, IA (US) 50401

( * ) Notice: Subject to any disclaimer, the term of this patent is extended or adjusted under 35 U.S.C. 154(b) by 490 days.

(21) Appl. No.: 11/893,504

(22) Filed: Aug. 16, 2007

(51) Int. Cl.
*A45F 5/00* (2006.01)
(52) U.S. Cl. .................. 294/152; 294/151; 294/165
(58) Field of Classification Search .............. 294/1.1, 294/149, 151, 152, 165; 190/1, 8; 5/417, 5/420
See application file for complete search history.

(56) References Cited

U.S. PATENT DOCUMENTS

| | | | | |
|---|---|---|---|---|
| 954,840 A * | 4/1910 | Wiedemann | ................ | 294/141 |
| 4,658,452 A * | 4/1987 | Brockhaus | ................ | 5/420 |
| 4,890,873 A * | 1/1990 | Prada et al. | ................ | 294/152 |
| 5,035,013 A * | 7/1991 | Bloom | ................ | 5/420 |
| 5,066,143 A * | 11/1991 | Sanders | ................ | 383/4 |
| 5,075,897 A * | 12/1991 | Daniels | ................ | 2/48 |
| 5,836,812 A * | 11/1998 | Brackett | ................ | 452/187 |
| 6,212,711 B1 * | 4/2001 | Gilmour | ................ | 5/420 |
| 2006/0232082 A1 * | 10/2006 | Tiura | ................ | 294/1.1 |

* cited by examiner

*Primary Examiner*—Dean J Kramer
(74) *Attorney, Agent, or Firm*—G. Brian Pingel; Camille L. Urban

(57) ABSTRACT

A method and apparatus for transporting a turkey tail to a hunting site are provided by the present invention. The apparatus is formed of an outer camouflaged base fabric sewn at its edges to an inner fabric. When folded along a diameter, the apparatus is semi-circular in shape. Hook and loop straps along the base fabric secure the apparatus and two handles attached to the base fabric facilitate transport. Reinforcing members between the fabrics protects the turkey tail from damage during transport.

9 Claims, 4 Drawing Sheets

TURKEY TAIL TRANSPORTER FOR HUNTING

BACKGROUND OF THE INVENTION

1. Field of the Invention

The present invention relates to devices and methods for hunting turkeys with turkey decoys, specifically, apparatuses for carrying turkey tails to a location for hunting.

2. Description of Related Art

It is known in the art of turkey hunting to use turkey decoys to lure turkeys into a hunting location. Turkey decoys are optimally effective when combined with a tail resembling a turkey tail and preferably formed of natural turkey feathers. Turkey tails are inherently fragile and easily damaged during transportation to a hunting site. It is therefore desirable to have an apparatus to transport turkey tails to a hunting site without risk of damage.

SUMMARY

The present invention provides an apparatus of camouflaged base fabric for transporting turkey tails, either natural or man made, to a hunting site. The base fabric is circular and folded along its diameter to form a half-circle shape. Two reinforcing members are inserted within the folded fabric to protect the turkey tails from harm. An interior fabric sewn at the edges of the base fabric retains the reinforcing members. The apparatus of the preferred embodiment is closable by Velcro straps and able to be carried by two handles attached to the base fabric.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
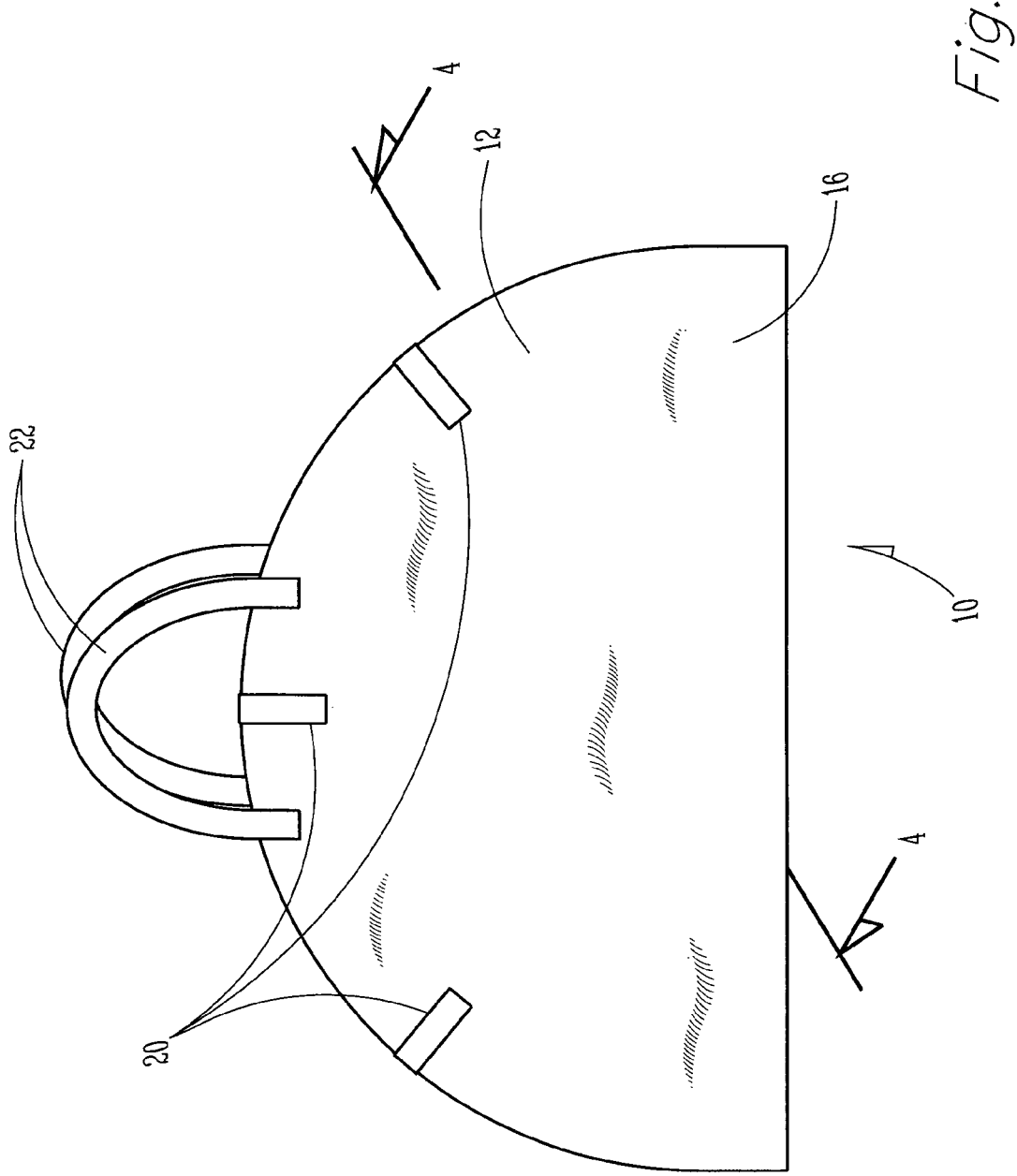
FIG. 1 is a perspective view of the preferred embodiment of the present invention.

A preferred embodiment of the present invention of an apparatus 10 for transporting and storing a natural or man made turkey tail is shown in FIG. 1. The apparatus 10 is surrounded by a base fabric 12 of preferably a camouflage printed textile material. The camouflage print can be of any pattern that will blend into a natural setting, but it is desirable that the pattern blend into the natural flora of wild turkey hunting sites.

Figure 2:
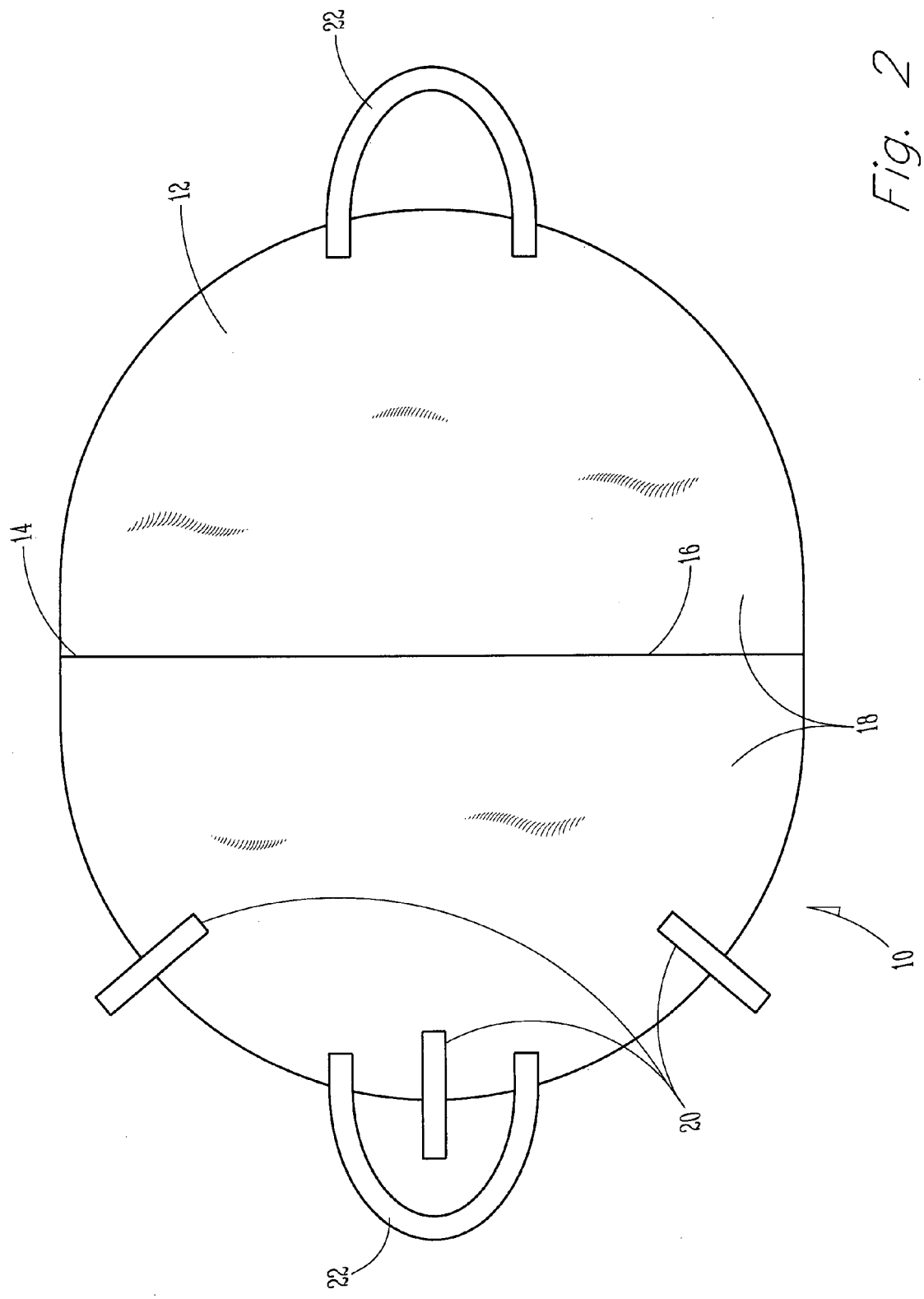
FIG. 2 is a bottom view of the preferred embodiment of FIG. 1 shown in an open condition.

The base fabric 12 is generally circular in shape, as shown in FIG. 2, and has a diameter 14 defining a fold 16 and separating the base fabric 12 into two equal halves 18. When the base fabric 12 is folded, as seen in FIG. 1, the two equal halves 18 come together and the apparatus 10 comprises a substantially half circle shape.

The folded base fabric 12 is secured in the preferred embodiment by hook and loop, a.k.a. Velcro®, straps 20 serving as means for securing the base fabric 12. It should be understood that other devices may serve as securing means, but Velcro® is preferable due to its ease of use, flexibility, cost, and capability of accepting camouflage patterns. The Velcro® straps 20 of the preferred embodiment share the same camouflage pattern as the base fabric 12.

The apparatus 10 is made easier to transport by inclusion of handles 22. In the preferred embodiment, each of two handles 22 is sewn to the base fabric 12 on opposing edges of each of the two equal halves 18. Although only one handle is necessary, the use of the two handles 22 is preferable because they balance the apparatus. 10 for easier carrying to a hunting site. The handles 22 may be formed of any material, but the handles of the preferred embodiment are composed of flexible nylon and may also, therefore, be camouflaged.

Figure 3:
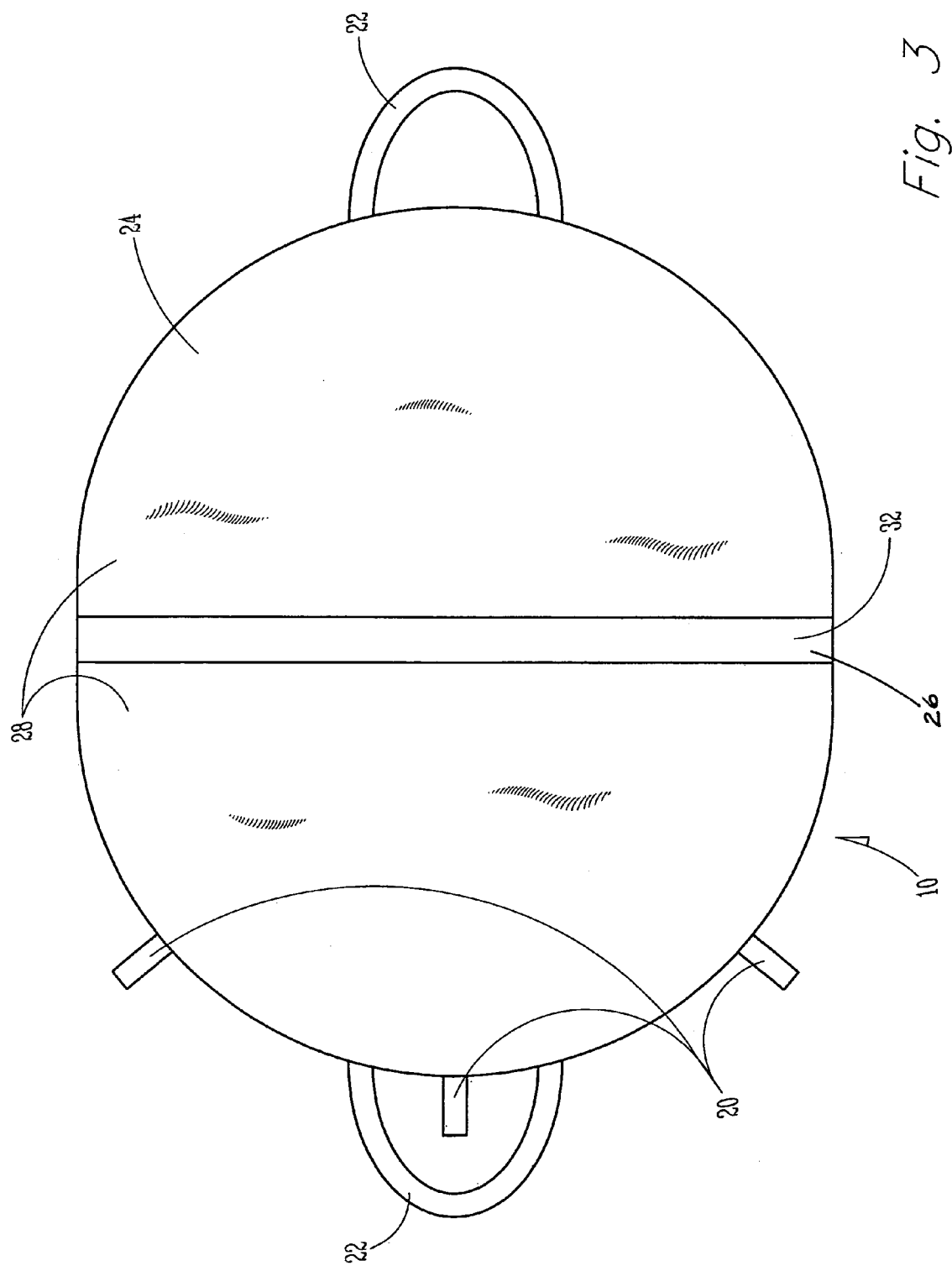
FIG. 3 is a top view of the preferred embodiment of FIG. 1 shown in an open condition.

Referring now to FIG. 3, the apparatus 10 of the preferred embodiment further includes an interior fabric 24 sewn to the base fabric 12 along its edges. The interior fabric 24 must therefore be cut substantially identical in shape to the base fabric 12 and have a diameter 26 defining a fold 28 both corresponding to the diameter 14 and fold 16 of the base fabric 12.

Figure 4:
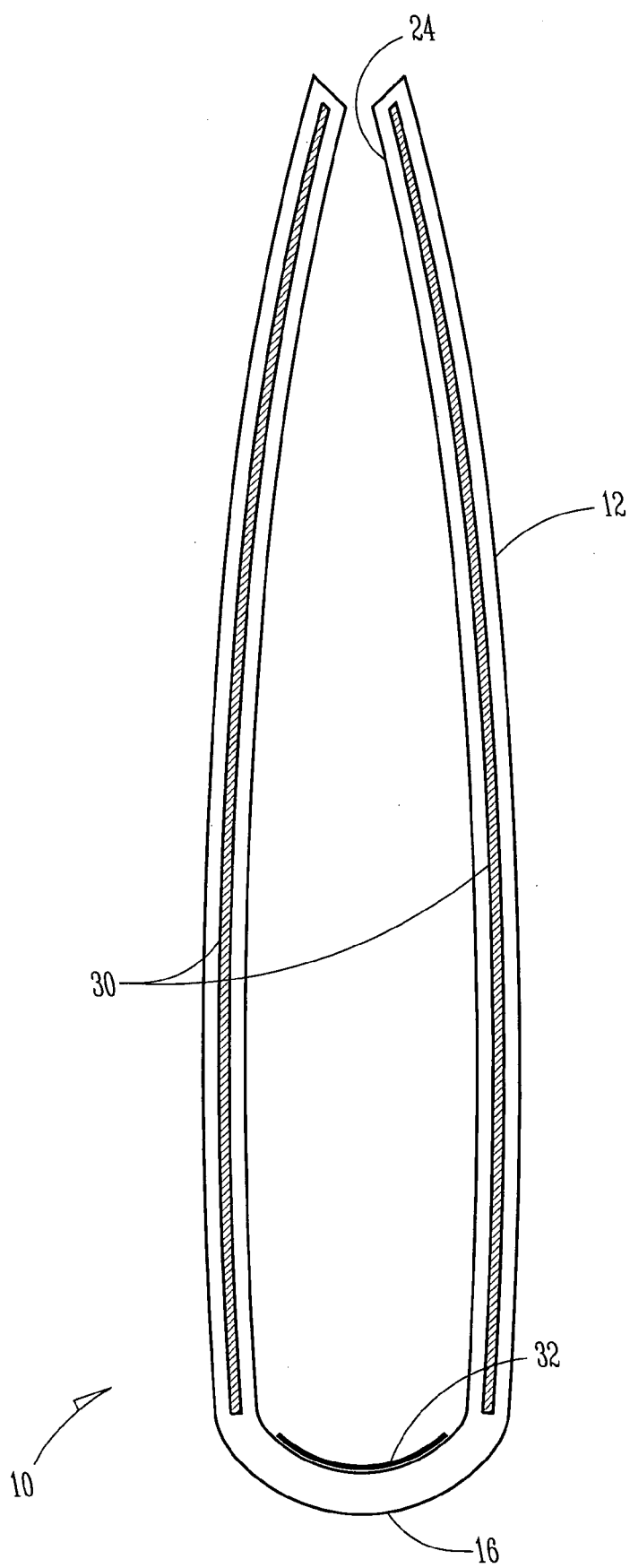
FIG. 4 is a cross-section view of the preferred embodiment of FIG. 1 taken along lines 4-4.

Disposed between the base fabric 12 and the interior fabric 24 are reinforcing members 30, as shown in FIG. 4. It is preferred that each of the reinforcing members 30 reinforce all of the space between the edges of the fabrics 12 and 24 and the fold 28. It is therefore further preferred that the reinforcing members 30 are semicircular in shape generally corresponding to the shape of the fabrics 12 and 24.

For insertion of the reinforcing members 30, it is preferred that the interior fabric 24 be severed along its diameter 26. Alternatively, the reinforcing members 30 may be inserted between the fabrics 12 and 24 before the fabrics 12 and 24 are sewn along their edges. To further secure the reinforcing members 30 in the preferred embodiment, an elongated fabric 32 is sewn along the diameter of the interior fabric 24, as shown in FIG. 4. It is preferable that the reinforcing members 30 are made of a rigid material, and in the preferred embodiment the reinforcing members 30 are made of corrugated plastic. The reinforcing members 30 protect the turkey tail from damage during transportation of the apparatus 10 to a hunting site.

It is advantageous to use the apparatus 10 of the present invention to transport a similar sized turkey tail to a hunting site. The apparatus can thus be of any size but is preferably sized large enough to hold a variety of turkey tails. The camouflaged base fabric 12 is advantageous for use of the apparatus 10 in hunting, as camouflage material is less likely to be spotted by a wild turkey. The Velcro® straps 20 and handle 22 are also camouflaged in the preferred embodiment. The present invention is therefore also a method for hunting using the apparatus 10 to transport a turkey tail to a hunting site. It is preferable to use the apparatus 10 of the preferred embodiment.

Thus, the present invention has been described in an illustrative manner. It is to be understood that the terminology that has been used is intended to be in the nature of words of description rather than of limitation.

Many modifications and variations of the present invention are possible in light of the above teachings. For example, any number of Velcro® straps may be used as securing means.

Therefore, within the scope of the appended claims, the present invention may be practiced otherwise than as specifically described.

What I claim is:

1. An apparatus for transporting and storing a turkey tail, said apparatus comprising:
   a) at least one layer base fabric of textile material, generally circularly shaped, having a diameter defining two equal halves; and defining a fold along said diameter such that said apparatus comprises a substantially half-circle shape upon folding of said base fabric;
   b) at least two rigid reinforcing members shaped substantially similar to each of said equal halves and located within said folded base fabric;
   c) means for securing said folded base fabric in a closed condition;
   d) at least one handle attached to said base fabric;
   e) an interior fabric substantially identically shaped to said base fabric, having a diameter corresponding the diameter of said base fabric and defining two equal halves, defining a fold along said interior fabric diameter, and sewn to said base fabric along the edges of said interior fabric and said base fabric such that said interior fabric is within said base fabric upon folding of said fabrics and said interior fabric has been severed along said diameter, comprises said two equal halves, and is not secured to said base fabric along said diameter; and
   f) said reinforcing members located between said fabrics.

2. The apparatus of claim 1 wherein said equal halves of said interior fabric are attached with an elongated fabric along said diameter to secure said reinforcing members.

3. The apparatus of claim 2 wherein said securing means comprises at least one strap means.

4. The apparatus of claim 3 wherein there are a plurality of strap means each attached along said base fabric and positioned at different locations along said base fabric.

5. The apparatus of claim 4 wherein said apparatus includes two of said handle.

6. An apparatus for transporting and storing a turkey tail, said apparatus comprising:
   a) at least one layer base fabric of textile material;
   b) said base fabric generally circularly shaped, having a diameter defining two equal halves, and defining a fold along said diameter such that said apparatus comprises a substantially half-circle shape upon folding of said base fabric;
   c) at least one handle attached to said base fabric;
   d) an interior fabric substantially identically shaped to said base fabric, having a diameter corresponding the diameter of said base fabric and defining two equal halves corresponding to said two equal halves of said base fabric, and defining a fold along said interior fabric diameter and said equal halves of said interior fabric are severed and attached with an elongated fabric along said diameter to secure said reinforcing members;
   e) said interior fabric sewn to said base fabric along the edges of said fabrics such that said interior fabric is within said base fabric upon folding of said fabrics;
   f) at least two rigid reinforcing members shaped substantially similar to each of said equal halves and located between said fabrics; and
   g) at least one hook and loop strap attached to said base fabric for closing said apparatus.

7. The apparatus of claim 6 wherein said rigid reinforcing members consist of corrugated plastic.

8. The apparatus of claim 6 wherein there are a plurality of hook and loop straps each attached to said base fabric and positioned at different locations along said base fabric.

9. The apparatus of claim 8 wherein said apparatus includes two of said handle, one of said handles attached to one of said two equal halves of said base fabric and the other of said handles attached to the other of said two equal halves of said base fabric.

* * * * *